United States Patent [19]

Huber, Jr.

[11] Patent Number: 4,792,116
[45] Date of Patent: Dec. 20, 1988

[54] SANDBLASTING NOZZLE AND CONTROL VALVE ASSEMBLY

[76] Inventor: George H. Huber, Jr., 807 Moores La., New Castle, Del. 19720

[21] Appl. No.: 154,107

[22] Filed: Feb. 9, 1988

[51] Int. Cl.4 .......................... F16K 31/53; F16L 58/10
[52] U.S. Cl. ...................................... 251/229; 251/232; 251/249.5; 251/299; 251/298; 137/375; 137/556.3
[58] Field of Search ...................... 137/375, 556, 556.3; 251/239, 232, 249.5, 279, 298

[56] References Cited

U.S. PATENT DOCUMENTS

| 446,059 | 2/1891 | Crawford | 251/298 |
|---|---|---|---|
| 1,020,022 | 3/1912 | Burke | 251/298 |
| 1,105,209 | 7/1914 | Sauchereau | 251/249.5 |
| 1,312,839 | 8/1919 | Dembowsky | 251/298 |
| 1,381,511 | 6/1921 | Smith | 251/279 |
| 1,777,580 | 10/1930 | Russell | 251/298 |
| 1,856,138 | 5/1932 | Ruemelin | 251/298 |
| 1,986,252 | 1/1935 | Conran | 251/249.5 |
| 2,839,082 | 6/1958 | Moore | 251/279 |
| 2,852,037 | 9/1958 | Downing et al. | 251/298 |
| 2,873,942 | 2/1959 | Drane | 251/249.5 |
| 3,063,298 | 11/1962 | Elliott | 251/279 |
| 3,084,904 | 4/1963 | McGay | 251/298 |
| 3,228,651 | 1/1966 | Egashira | 251/298 |
| 3,307,573 | 3/1967 | Epstein | 251/298 |
| 3,438,388 | 4/1969 | Schenck, Jr. | 137/375 |
| 3,522,929 | 8/1970 | De Simone | 251/298 |
| 4,460,011 | 7/1984 | Huber, Jr. | 251/298 |

FOREIGN PATENT DOCUMENTS 1148736 12/1957 France ................ 251/279

Primary Examiner—George L. Walton
Attorney, Agent, or Firm—Mason, Fenwick & Lawrence

[57] ABSTRACT

A control valve assembly to be assembled with a discharge nozzle of a sandblasting abrasive cleaning system or the like, comprising a valve housing to be connected at an inlet end to a supply conduit having a lower valve chamber and a well formation providing a lateral compartment communicating with the valve chamber, a circular valve seat at the discharge end of the valve chamber providing a beveled seating surface, and a pivot valve member supported for movement into and from the valve chamber having a generally cylindrical valve head and beveled surface to conform to and seat tightly against the seating surface and having an elongated stem portion extending in inclined relation from the valve head. A wheel controlled operating shaft is journaled in the well formation having a first linkage yoke member thereon connected to the valve member and a second linkage member coactive with the first linkage yoke member to tilt the valve member while concurrently moving it arcuately about the shaft upon shaft rotation to retract the valve member substantially fully into the lateral well formation to an open position disposing the stem portion substantially parallel to the longitudinal center axis of the valve chamber and to advance the valve member therefrom to closed portion.

20 Claims, 3 Drawing Sheets

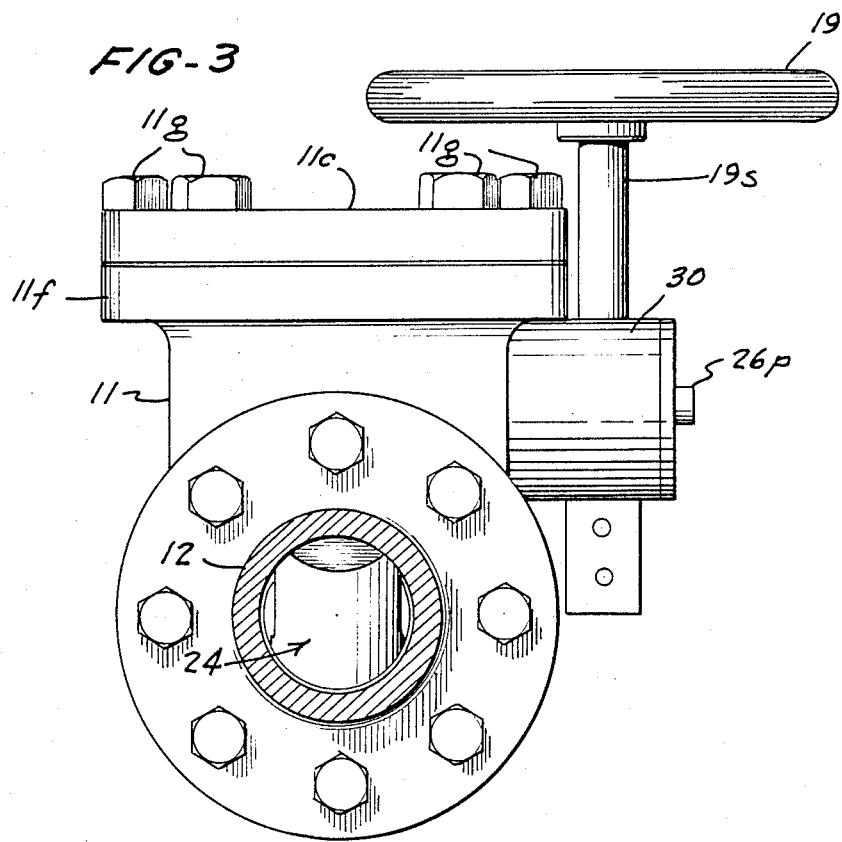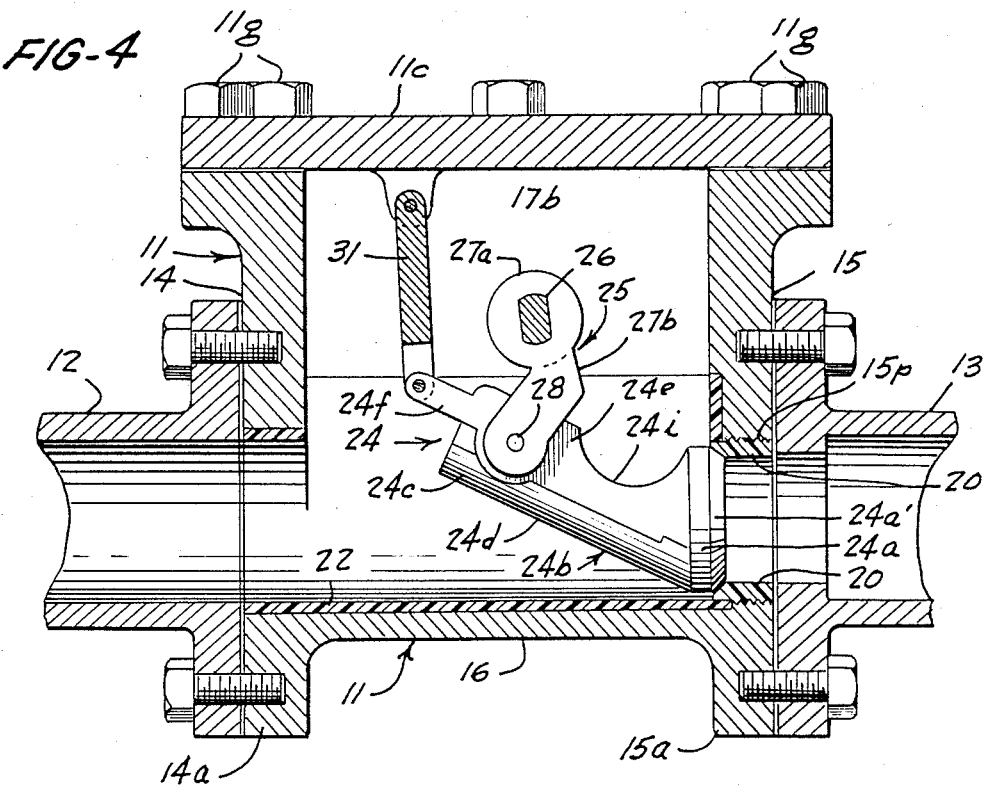

SANDBLASTING NOZZLE AND CONTROL VALVE ASSEMBLY

BACKGROUND AND OBJECTS OF THE INVENTION

The present invention relates, in general, to a nozzle and control valve assembly for pressurized abrasive cleaning systems and the like, and more particularly to a control valve structure immediately adjoining and connected to a sandblasting nozzle in pressurized sandblasting cleaning system whereby valve control of the sandblasting steam is under control of the workman at the nozzle location adjacent the surface being sandblasted.

Heretofore, many sandblasting systems and air-water-chemical or other abrasive media systems have been devised wherein some kind of manually controllable valve structure in incorporated in the system to provide operator control of the sandblasting stream or abrasive material stream to be discharged from the associated hose and nozzle system leading from a compressor to permit operator control of the abrasive cleaning stream. However, the control valve structure has most frequently been located at the source of the compressed air and sand or other abrasive material, rather than at the nozzle or work location, because of the severe disintegration and wearing which has been encountered where attempts have been made to provide the control valve at the nozzle location or discharge stream end. Because of the highly abrasive nature of the pressurized cleaning stream being conveyed through the hose and nozzle, and therefore the severe abrasion wear on the components of valve mechanisms exposed to the abrasive stream near the nozzle end of the hose and nozzle parts of the system, it has been considered expedient to locate the control valve structure back at the upstream or source end of the hose adjacent the source of the sand and pressurized air and/or water to provide an arrangement which would have an acceptable useful work life.

I have heretofore developed a control valve assembly for use with a sandblasting nozzle, as disclosed in my U.S. Pat. No. 4,460,011 granted July 17, 1984, wherein the control valve is constructed in such manner and with such materials as to be sufficiently wear resistant to the highly abrasive materials flowing in the sandblasting or abrasive pressurized stream to provide acceptably useful life and still allow control of the sandblasting or pressurized abrasive stream at the nozzle location immediately adjacent the surface being abrasively cleaned. Such prior control valve of my earlier patent was constructed in such a manner to allow higher volumes of air and sand or other abrasive media to pass through the valve with less wear than previous sandblasting or similar valve mechanisms located near the discharge end of sandblasting hose systems, and wherein the valve structure can be used with many different types of pressurized abrasive media systems because of its high abrasion resistance and particular valve design.

An object of the present invention is the provision, an improved control valve structure, for sandblasting nozzles wherein movement of the valve member is effected in a different manner having certain advantages over my earlier control valve structure.

Other objects, advantages and capabilities of the present invention will become apparent from the following detailed description, taken in conjunction with the accompanying drawings showing a preferred embodiment of the invention.

BRIEF DESCRIPTION OF THE FIGURES

FIG. 3 is an end elevational view thereof as seen from the left of FIG. 2;

FIG. 4 is a longitudinal vertical section view taken along the line 4—4 of FIG. 1, with the valve in a first, closed position associated with an unworn valve seat;

DETAILED DESCRIPTION OF A PREFERRED EMBODIMENT

Figure 1:
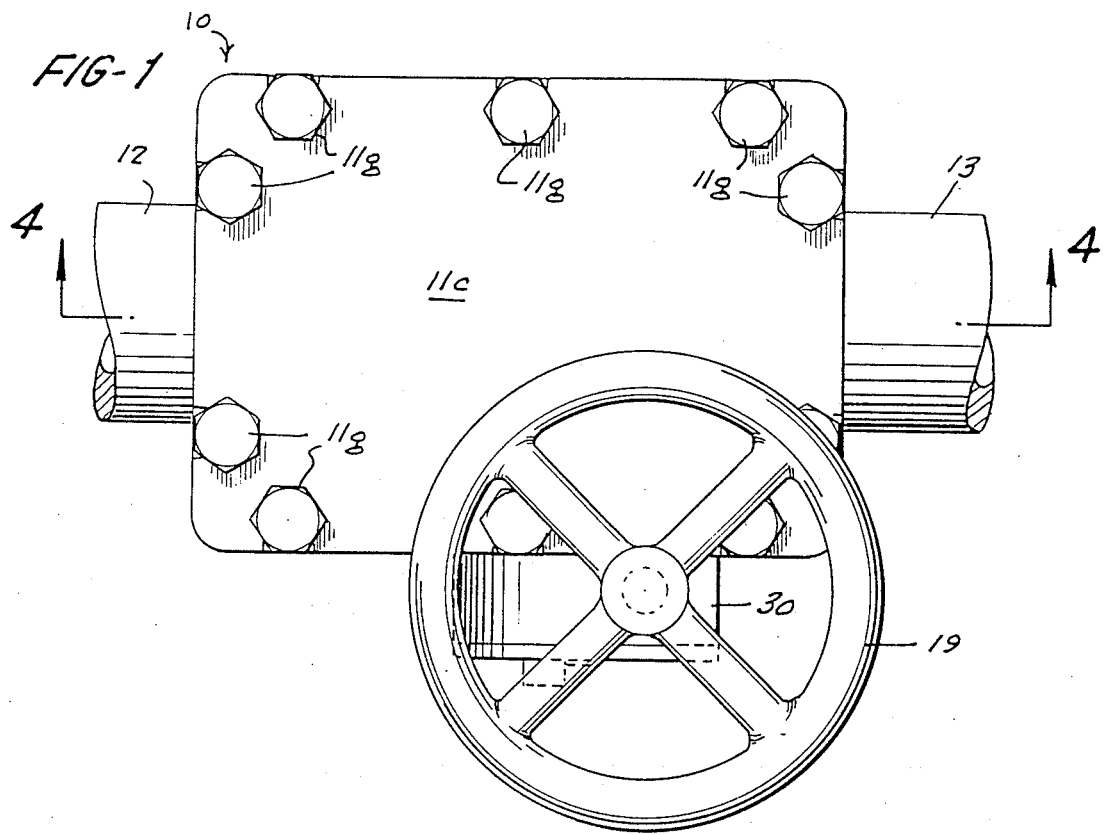
FIG. 1 is a top plan view of an intercoupled control valve and nozzle assembly for a sandblasting or pressurized abrasive media surface abrasion system embodying the present invention.
Figure 2:
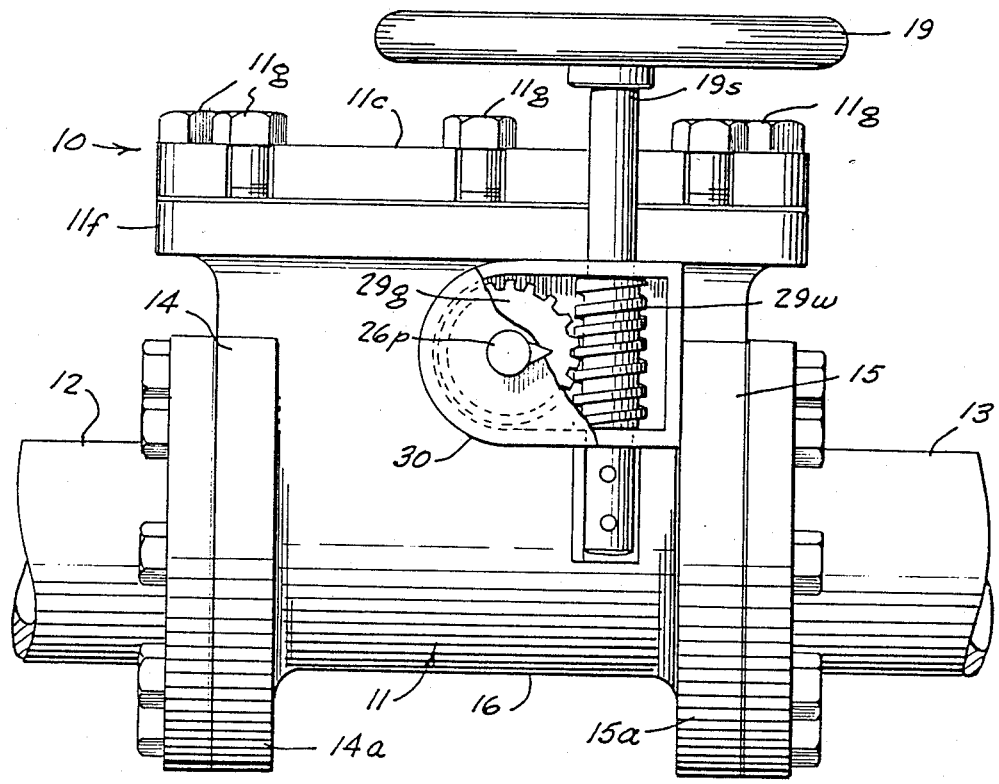
FIG. 2 is a side elevation view thereof.

Referring to the drawings, wherein like reference characters designate corresponding parts throughout the several figures, there is shown in FIGS. 1–4 the control valve assembly of the present invention joined to the immediately associated parts of a sandblasting abrasive cleaning system or similar air-water-chemical or abrasive media cleaning system, wherein the control valve assembly is generally indicated by the reference character 10 and comprises valve case or housing 11 joined at one end to a pipe or sandblast hose 12 leading to pressurized supply source for the air and sand or air/water and other abrasive media and joined at the other end to a typical sandblast nozzle or discharge pipe 13 which in the illustrated embodiment has a ribber exterior and is threaded at the end to be joined to the valve assembly case 11 to thread into the adjacent end portion of the valve case 11. In the illustrated embodiment, the valve case or housing member 11 includes end walls 14, 15 having a pair of mounting flanges 14a, 15a, for securing the valve housing to the supply pipe or hose 12 and to the nozzle 13. Between these two end walls 14 and 15 is the intermediate valve chamber portion 16 defining a lower valve chamber 17a a communicating at its rear end with the supply pipe 12 and communicating at its other end through an internally threaded port 15p in the end wall 15 forming a valve seat supporting channel for the valve seat member 20. The valve case 11 has an upwardly extending top portion enclosing an upwardly extending top well formation 17b adjoining the valve chamber 17a for housing the mechanism for operating the valve member and portions of the valve member when in the open position. As shown in FIGS. 1-3, the valve housing or case 11 is closed at the top by a valve cover member indicated at 11c secured to the flange 11f of the valve case or housing 11 by bolt and nut fasteners indicated at 11g.

The valve seat, indicated by reference character 20, is an annular cylindrical member, formed for example of polyurethane, provided if desired with tungsten carbide ribs (not shown), in the general shape of an annular cylinder sized to seat in and be restrained in the threaded part 15p of the case or housing 11, and having a beveled or truncated conical surface 20a to define the actual seat against which the valve ember presses to close the valve.

To protect the surfaces of the valve case or housing member 11 bounding the intermediate valve chamber 17a against the corrosive and abrading effects of the abrading medium, these surfaces are covered by a formed-in-place or poured-in-place valve chamber liner, for example of polyurethane or gum rubber, indicated by the reference character 22, which assumes an upwardly facing or opening "U" shaped configuration corresponding to that of the inwardly bounding surfaces of the valve chamber 17a. A unique pivot valve member, indicated by the reference character 24, is housed in the valve chamber 17, and comprises a generally cylindrical, beveled valve head portion 24a having a truncated conical surface portion 24a' which conforms to and tightly seats against the correspondingly shaped valve contact seat portion 20a of the valve seat member 20. Extending rearwardly at an upwardly inclined angle relative to the center axis of the head portion 24a when the valve member is viewed in closed position, is an elongated stem portion 24b, which is of substantially inverted "T" shaped cross-section defining a wider bottom portion of flange like configuration 24c having a convex bottom surface 24d whose curvature corresponds substantially to that of the projection of the perimeter of the head portion 24a along the longitudinal axis of the stem portion, and which defines a rising vertical center rib portion 24e terminating rearwardly in an elongated or rearwardly extending tail member 24f. A concave, almost half-cylindrical cutout 24i is provided in the upper surface of the vertical center rib portion 24e immediately rearwardly of the enlarged head portion 24a shaped to receive portions of the linkage yoke or fork member 25 and of the operating shaft 26 therefor when the pivot valve member 24 is in the raised or retracted open position shown in FIG. 6. In these respects, the valve member 24 is similar to the valve member shown and described in my earlier U.S. Pat. No. 4,460,011.

Figure 5:
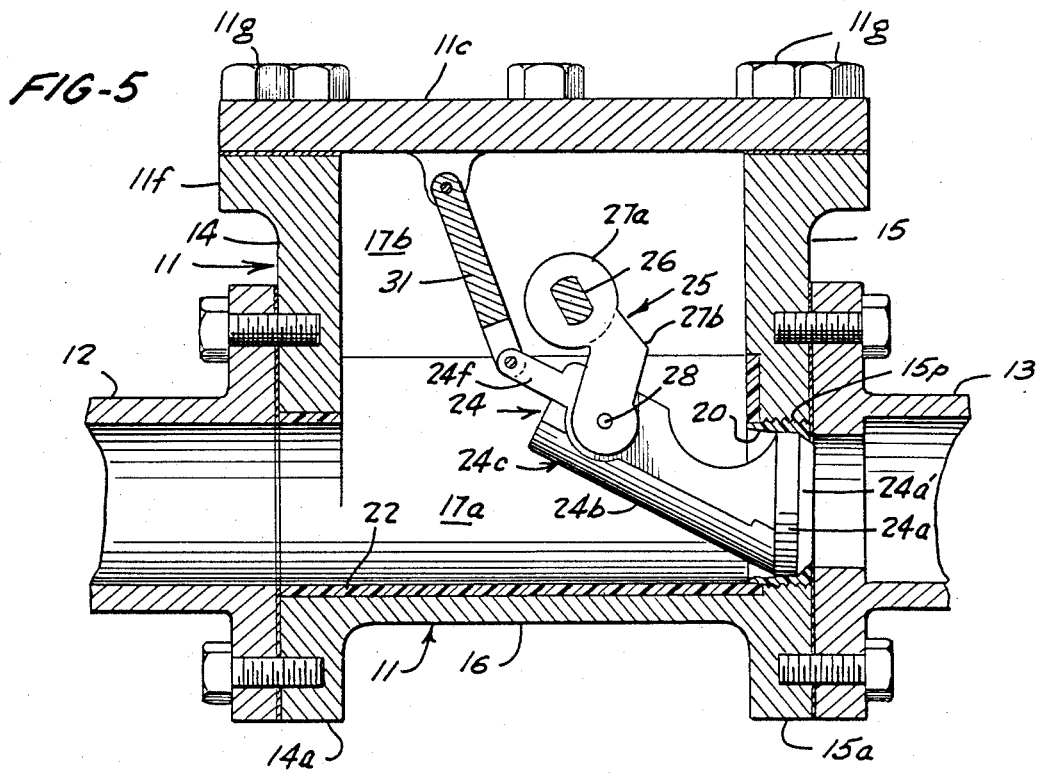
FIG. 5 is a longitudinal vertical section view taken along the same plane as FIG. 4, but showing the valve in a second closed position wherein the valve is spaced the longest distance from its open position, occupying a closed position with a badly worn valve seat.

As illustrated in the drawings, the linkage yoke member 25 comprises a cylindrical upper end portion 27a having a transverse shaped bore therethrough for receiving the operating shaft 26, and a pair of transversely spaced angle arms 27b extending therefrom terminating in apertured knuckled formations 27c for receiving a connecting pin or shaft 28 which extends through and is lightly press fit in the apertures in the knuckle formations 27c and through a transverse hole in the vertical center rib portion 24e of the pivot valve member 24 sized to permit pivoting of the valve member about the axis of the connecting pin 28. As shown in FIGS. 4 and 5, the cross-section of the transverse bore through the cylindrical end portion 27a is a circular cross-section interrupted by two folds extending along opposite, similarly spaced chords of the circle providing a non-round opening causing coordinate movement of the operating shaft 26 and linkage yoke member 25, and one end portion 26a of the shaft is provided with opposite flats producing a similar non-round configuration to be received in a similarly shaped opening in a gear member 29g located outside and along one side of the valve case or housing member 11 for manual operation of the valve member 24 from a hand wheel 19.

As shown best in FIG. 2, the hand wheel 19 has a shaft 19s which extends into a worm gear box 30 fixed to the side of the valve case or housing member 11 enclosing the worm gear formation 29w on the lower end of the shaft 19s which meshes with the teeth on the gear 29g. An externally extending end portion of the shaft 26 is cylindrical in shape, as shown in FIG. 2, and is provided with a pointer formation 26p as shown for visually indicating the shaft position, and therefor the valve position, located externally of the worm gear box 30.

Figure 6:
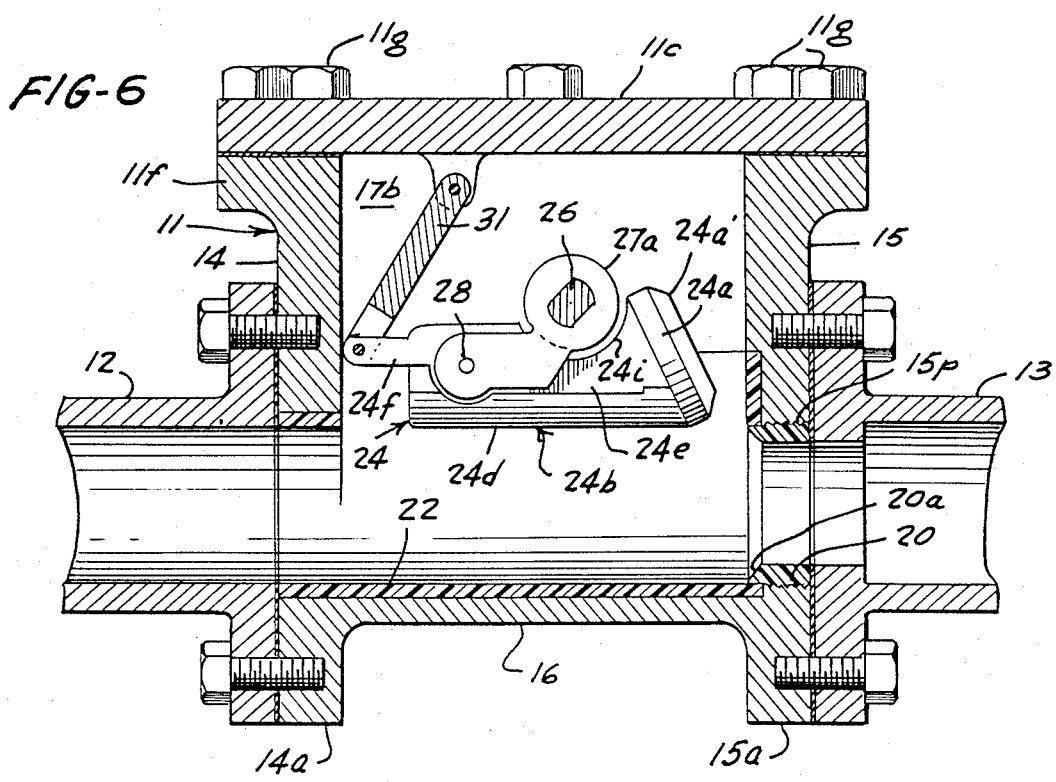
FIG. 6 is a longitudinal vertical section view taken along the same plane as FIG. 4, but showing the valve in open position.

As illustrated in FIG. 6 of my U.S. Pat. No. 4,460,011, the middle portions of the operating shaft 26 may extend through a bore in the upper cylindrical end portion 27a of the linkage yoke 25 and the opposite portions thereof flanking the yoke member 25 may extend outwardly through annular bushings housed in appropriate recesses formed in the opposite walls of the valve case of housing 11, with one end portion of the operating shaft 26 provided with an enlarged cylindrical portion 26b closely approximating and journaled in a circular cross-section journaling opening therefor in the valve case or housing 11, sealed by an "O"-ring in an "O"-ring groove in the circular portion of the operating shaft 26, and the end portion 26a of the shaft 26 extending outwardly from that side of the valve case member 11 receives the non-round opening in the gear 29g which is secured thereon by any conventional means.

In the operation of the sandblasting or abrasive media control valve assembly of the present invention, the valve, when the valve seat member 20 is in substantially new or unworn condition, is normally in the closed position illustrated in FIG. 4 wherein the beveled cylindrical head portion 24a of the valve member 24 is seated tightly against the beveled surface portion 20c of the valve seat member 20 with the center axis of the enlarged valve head 24a aligned with the center axis of the circular opening through the valve seat member 20 and the coincident center axes of the ports 14a and 15a at the opposite ends of the valve case or housing member 11. Assuming the end portion 14 to be assembled to a supply hose or pipe 12 from the abrasive material or sand source and pressurized air and/or water source and the end portion 15 to be assembled to the sandblasting nozzle 13, the operator rotates the hand wheel 19 to rotate in the gear 29 in a clockwise direction from the position illustrated in FIG. 4. During the approximately 60° movement of the gear 29, the operating shaft 26 is rotated through the corresponding 60° angle, swinging the connecting pin 28 through a corresponding 60° arc which retracts the valve member 24 rearwardly and upwardly along a path guided by the second link member 31 to a position wherein the valve member 24 is caused by link 31 to execute some counterclockwise movement about the axis of the connecting pin 28 until the valve member 24 reaches fully retracted position in the upper well formation 17b at the fully open position of FIG. 6. The valve is held in the open position by the hand wheel and associated worm and gear frictionally restraining the valve in this open position.

When it is desired to shift the valve to closed position, the hand wheel 19 is rotated to rotate gear 29g in a counterclockwise direction back to the FIG. 4 position. During this closing movement of the valve assembly, the connecting pin 28 and adjacent knuckle formation portions 27c of the linkage yoke member 25 and link 31 swing in a counterclockwise direction tilting the valve member 24 about the axis of the connecting pin 28 in proper relation to bring its center axis into substantial alignment with the center axis of the opening through the valve seat member 20 so that it can seat properly against the beveled valve seating surfaces 20a of the valve seat.

It will be noted particularly from comparison of FIGS. 4 and 5 that the closed position of the valve member 24 may vary depending upon the position of the beveled face 20a of the valve seat member 20, which in turn is dependent on the amount of wear or erosion by the abrasive sand particles altering the position of the beveled valve seat face 20a within the axially elongated outlet port 15p in the wall 15. For example, if the valve seat member 20 is worn substantially all the way through the axial length of the outlet port 15p, the shaft 26 may be rotated through about 75 from the open position to the closed position, causing the enlarged head portion 24a of the valve member to project substantially through the outlet port 15p to occupy the "longest distance" position shown in FIG. 5. This action and capacity of the mechanism to vary the location of the cylindrical head portion 24a of the valve member to occupy various positions along the axis of the outlet opening or port 15p assures effective closing of the valve at various conditions of wear of the valve seat member 20, increasing the useful life of the valve structure and considerably lengthening the period of time the valve structure can be used before requiring replacement of the valve seat member.

I claim:

1. A control valve assembly to be disposed in immediately adjacent communication with a discharge nozzle of a sandblasting abrasive cleaning system or the like, comprising a valve housing defining an elongated valve chamber extending along a longitudinal center axis therethrough between opposite inlet and discharge ends of the housing and chamber, inlet and outlet passage means for connecting the inlet end to a supply conduit for delivering an abrasive stream of pressurized fluid and sand to said valve chamber and for communicating said discharge end with the discharge nozzle, a well formation on said housing defining a lateral compartment communicating with said valve chamber, valve seat means at the discharge end of the valve chamber having a circular passage concentric with said center axis communicating with the nozzle and encircled by a truncated conical seating surface, a pivot valve member supported for movement into and from said valve chamber having a generally cylindrical valve head formed about an axis of revolution coinciding with said center axis when located in closed position and providing a beveled surface to conform to and seat tightly against said seating surface to close said passage, the valve member including an elongated stem portion extending in said closed position from said valve head toward said end cavity along a path inclined to said center axis, an operating shaft journaled in said well formation, a handle for rotating the shaft, and a first linkage yoke member mounted at one end thereof on said shaft and connected at its other end to said stem portion at an end opposite said valve head, for moving the valve member between an open position and said closed position, a second linkage member pivoted at one end to said housing and at another end to said valve member, the yoke member and second linkage member directly upward from the valve seat in a vertical direction within the valve housing being located and shaped to tilt the valve member while concurrently moving it arcuately about the shaft upon shaft rotation to retract the valve member substantially fully into said lateral compartment to said open position disposing said entire stem portion substantially parallel to said center axis and parallel to the inlet and outlet passage means to effect said moving of the valve member therefrom to said closed position.

2. A control valve assembly as defined in claim 1, wherein valve member includes a tail formation extending from an end of the stem remote from said valve head, said second linkage member being pivoted to said tail formation to direct the same into said lateral compartment at said open position of the valve member and position said tail formation during retracting and advancing movement of the valve member to tilt the latter about the connection thereof with said yoke member.

3. A control valve assembly as defined in claim 2, wherein said stem portion of said valve member is of generally inverted "T"-shaped cross-sectional configuration providing a bottom flange formation having a downwardly convex generally cylindrical bottom surface extending concentric with the stem axis as a continuation of the cylindrical periphery of said cylindrical valve head.

4. A control valve assembly as defined in claim 2, wherein said stem portion has an inverted "T"-shaped cross-sectional configuration providing a center vertical web portion rising from a bottom flange formation and said linkage yoke member includes generally cylindrical upper end portion mounted on said shaft and a pair of transversely spaced angular yoke arms extending from said cylindrical portion in laterally flanking relation to said web portion and joined thereto by a pivot member.

5. A control valve assembly as defined in claim 4, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

6. A control valve assembly as defined in claim 4, wherein said web portion of said valve stem portion includes an upwardly concave recess along the uppermost edge thereof shaped to receive the cylindrical end portion of said yoke member nested therein when said valve member occupies said open position.

7. A control valve assembly as defined in claim 6, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

8. A control valve assembly as defined in claim 2, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

9. A control valve assembly as defined in claim 1, wherein said valve chamber is lined along the bottom and side portions thereof opposite and adjacent said side compartment with a poured-in-place polyurethane liner for resisting abrading of the surfaces thereof by abrasive cleaning medium passing therethrough.

10. A control valve assembly as defined in claim 1, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

11. A control valve assembly as defined in claim 1, wherein said stem portion of said valve member is of generally inverted "T"-shaped cross-sectional configuration providing a bottom flange formation having a downwardly convex generally cylindrical bottom surface extending concentric with the stem axis as a continuation of the cylindrical periphery of said cylindrical valve head.

12. A control valve assembly as defined in claim 11, wherein said inverted "T"-shaped cross-sectional configuration of said stem portion provides a center vertical web portion rising from said bottom flange formation and said linkage yoke member includes a generally cylindrical upper end portion mounted on said shaft and a pair of transversely spaced angular yoke arms extending form said cylindrical portion in laterally flanking relation to said web portion and joined thereto by a pivot member.

13. A control valve assembly as defined in claim 12, wherein said web portion of said valve stem portion includes an upwardly concave recess along the uppermost edge thereof shaped to receive the cylindrical end portion of said yoke member nested therein when said valve member occupies said open position.

14. A control valve assembly as defined in claim 12, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

15. A control valve assembly as defined in claim 11, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

16. A control valve assembly as defined in claim 1, wherein said stem portion has an inverted "T"-shaped cross-sectional configuration providing a center vertical web portion rising from a bottom flange formation and said linkage yoke member includes a generally cylindrical upper end portion mounted on said shaft and a pair of transversely spaced angular yoke arms extending from said cylindrical portion in laterally flanking relation to said web portion and joined thereto by a pivot member.

17. A control valve assembly as defined in claim 16, wherein said web portion of the valve stem includes an upwardly concave recess along the uppermost edge thereof shaped to receive the cylindrical end portion of said yoke member nested therein when said valve member occupies said open position.

18. A control valve assembly as defined in claim 17, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

19. A control valve assembly as defined in claim 16, wherein said valve chamber is lined along the bottom and side portions thereof opposite and adjacent said side compartment with a poured-in-place polyurethane liner for resisting abrading of the surfaces thereof by abrasive cleaning medium passing therethrough.

20. A control valve assembly as defined in claim 16, wherein said housing includes an outlet end wall having a cylindrical port therethrough defining said outlet passage means having an axial length accommodating a predetermined range of axial positions of the beveled surface portion of said valve head therein corresponding to variable locations of said seating surface of said valve seat means resulting from wear thereon, and said first linkage yoke member having a range of pivotal and translation movement responsive to rotation of said operating shaft to tightly seat said beveled surface against said seating surface at said variable locations of the latter.

* * * * *